United States Patent
Nakagawa

[11] 4,170,402
[45] Oct. 9, 1979

[54] VERY COMPACT WIDE-ANGLE ZOOM LENS SYSTEM

[75] Inventor: Jihei Nakagawa, Murayama, Japan

[73] Assignee: Olympus Optical Co., Ltd., Tokyo, Japan

[21] Appl. No.: 880,494

[22] Filed: Feb. 23, 1978
(Under 37 CFR 1.47)

[30] Foreign Application Priority Data

Feb. 23, 1977 [JP] Japan .................................. 52-18147

[51] Int. Cl.² ............................................. G02B 15/14
[52] U.S. Cl. ..................................... 350/184; 350/176
[58] Field of Search .................... 350/184, 186, 176

[56] References Cited

U.S. PATENT DOCUMENTS

| | | | |
|---|---|---|---|
| 3,771,853 | 11/1973 | Nakamura | 350/184 |
| 3,840,290 | 10/1974 | Betensky | 350/184 |

*Primary Examiner*—Paul A. Sacher
*Attorney, Agent, or Firm*—Cushman, Darby & Cushman

[57] ABSTRACT

A very compact wide-angle zoom lens system with favorably corrected aberrations comprising a first lens group consisting of a negative meniscus lens element and a lens component having negative refractive power, a second lens group consisting of a positive cemented lens component and a negative meniscus lens element, and a third lens group comprising at least a positive meniscus lens element and a cemented lens component. The lens system is so designed as to permit zooming by displacing said first, second and third lens groups respectively.

8 Claims, 16 Drawing Figures

VERY COMPACT WIDE-ANGLE ZOOM LENS SYSTEM

BACKGROUND OF THE INVENTION (a) Field of the Invention

The present invention relates to a zoom lens system and more specifically to a compact wide-angle zoom lens system.

(b) Description of the Prior Art

Remarkable progress has recently been made in wide-angle zoom lens systems. However, it has conventionally been considered very difficult to design wide angle zoom lens systems very compactly. The reason for it is that diameter of the front lens element is unavoidably increased, in case of zoom lens systems, in order to utilize oblique rays reaching the corners of image plane, and diameter of filter is determined according to diameter of the front lens element. Even if it is possible to minimize diameter of the front lens element, diameter of filter is increased as angle of field is widened and, therefore, outside diameter of the lens systems as completed products is still enlarged. Further, when focusing is to be preformed by the front lens group, diameter of the lens systems as completed products must be still increased taking the advancing distance for focusing into consideration so that the oblique rays will not be eclipsed. Zoom lens systems have an inherent factor to have large dimensions since airspaces are required for displacing lens groups for zooming.

SUMMARY OF THE INVENTION

A general object of the present invention is to provide a compact wide-angle zoom lens system wherein a lens group having a negative focal length is arranged on the object side and aberrations are favorably corrected though it has a very wide field angle of 84° at its wide position.

There have conventionally been known to those skilled in the art inverted telephoto type zoom lens systems consisting of two lens groups. As field angle is widened, however, it abruptly becomes difficult to correct spherical aberration, coma, curvature of field, etc. over entire variable range of focal length in such lens systems. As a method to solve this problem, it can be considered to enhance flexibility for correcting aberrations by increasing number of lens groups or lens elements to be displaced for zooming. Although this method is possible theoretically, it is not preferable in practice since it poses many problems related to mechanisms and precision of lens systems as completed products.

The present invention has been achieved by positively applying the concept of minimization for wide-angle lens systems for general photographic cameras (general wide-angle lens systems other than zoom lens systems). Speaking in other words, the lens system according to the present invention comprises two fundamental negative and positive lens groups, the positive one of which is divided into two groups to be slightly displaced relative to each other for zooming, thereby enhancing flexibility for correcting aberrations. Composition of the zoom lens system according to the present invention is illustrated in FIG. 1 through FIG. 4. Speaking concretely, the lens system according to the present invention comprises a negative meniscus lens element having a convex surface on the object side and a positive and negative lens element which are cemented or separated, a second lens group consisting of a positive cemented lens component and a negative meniscus single lens element having a convex surface on the object side, and a third lens group comprising at least a positive meniscus single lens element having a convex surface on the object side and a cemented lens component. Said zoom lens system is characterized in that said first, second and third lens groups are displaced independently for zooming and that said lens system satisfy the conditions enumerated hereunder:

$$1.5f < |f_1| < 2f, f_1 < 0 \quad (1)$$

$$12f < f_2 < 15f \quad (2)$$

$$0.55f < D_2 < f \quad (3)$$

wherein the reference symbols represent as defined below:

$f$: focal length of the lens system as a whole at its wide position.

$f_1$: focal length of the first lens group $f_2$: focal length of the second lens group $D_2$: total length of the second lens group $(d_6 + d_7 + d_8 + d_9)$ The first lens group of the lens system according to the present invention has such a composition as is often seen in general wide-angle zoom lens systems but is characterized in that it has a short focal length $f_1$ as defined in the condition (1), thereby making it possible to design a compact wide-angle zoom lens system. If $f_1$ is shorter than the lower limit of the condition (1), it is advantageous for designing a compact lens system but is undesirable since it aggravates negative distortion at the wide position and spherical aberration when an object to be photographed is located at a short distance at the tele position. If $f_1$ exceeds the upper limit of the condition (1), in contrast, it will be impossible to design a compact lens system and coma will be aggravated if a compact lens system dared to be designed with a first lens group having such a long focal length.

In the second place, the lens system according to the present invention is also characterized in that its second lens group has a focal length $f_2$ as defined in the condition (2). If $f_2$ is shorter than the lower limit of the condition (2), Petzval's sum will be large, curvature of field will be aggravated, spherical aberration will be unbalanced between the wide position and tele position, and zonal spherical aberration will be aggravated. If $f_2$ exceeds the upper limit of the condition (2), offaxial rays will be remarkably undercorrected though Petzval's sum will be small. Further, it is necessary to select a long total length $D_2$ of the second lens group as defined in the condition (3) in order to correct curvature of field and distortion favorably. The condition (3) further serves, in combination with the condition (2) already described above, for positively applying the concept of enhancing performance and designing more compact lens systems for general photographic cameras. The condition (3) makes it possible to select relatively small radii of curvature on the surfaces of the respective lens elements which is effective for favorably correcting aberrations. If $D_2$ is shorter than the lower limit of the condition (3), Petzval's sum will be increased, spherical aberration will be aggravated and negative distortion will not be corrected at the wide position. If $D_2$ exceeds the upper limit of the condition (3), in contrast, there occurs tendencies to overcorrect spherical aberration in conjunction with composition of the third lens group, and to increase total length of the entire lens system.

Finally, when the first and second lens groups are so composed as to satisfy the above-mentioned conditions (1), (2) and (3), the third lens group must comprises at least a positive meniscus lens element and a cemented lens component. Said positive meniscus lens element in the third lens group is required for correcting spherical aberration and coma with good balance. In addition, said cemented lens component should preferably be relatively thick and have a low refractive power. In order to favorably correct chromatic aberration and astigmatism, it will be effective to select thickness $d_{13}+d_{14}$ of said cemented lens component and its focal length f' so that they will satisfy the conditions enumerated hereunder:

$$0.25f < d_{13}+d_{14} < 0.55f \quad (4)$$

$$|f'| > 5f \quad (5)$$

As is easily understood from the embodiments illustrated, a stop can be set at a rather optional position in the zoom lens system according to the present invention. When a stop is set on the object side, i.e., in the second lens group, it will be possible to design a lens system having a small outside diameter. When a stop is positioned at on the image side, in contrast, coma will be corrected rather easily though it is disadvantageous for designing a compact lens system.

DETAILED DESCRIPTION OF THE PREFERRED EMBODIMENTS

Figure 1:
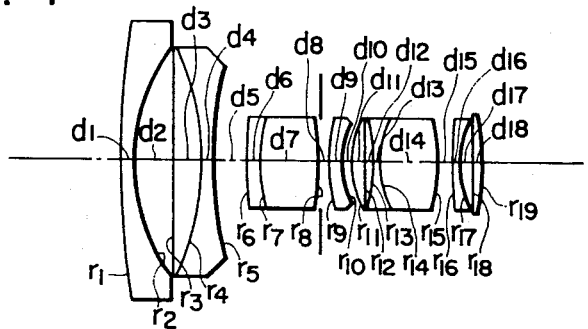
FIG. 1 through FIG. 4 show sectional views illustrating the compositions of the Embodiments 1 through 4 respectively of the present invention.

Now, some preferred embodiments of the present invention will be described detailedly below:

---

Embodiment 1

$f = 1.0 \sim 1.589$
$r_1 = 5.2540$
  $d_1 = 0.0815$   $n_1 = 1.72342$   $\nu_1 = 38.0$
$r_2 = 1.1981$
  $d_2 = 0.3014$
$r_3 = -64.0574$
  $d_3 = 0.1935$   $n_2 = 1.80518$   $\nu_2 = 25.4$
$r_4 = -1.7706$
  $d_4 = 0.0611$   $n_3 = 1.51118$   $\nu_3 = 51.0$
$r_5 = 2.1700$
  $d_5 = 1.2580 \sim 0.2649$
$r_6 = 4.3124$
  $d_6 = 0.0815$   $n_4 = 1.72$   $\nu_4 = 42.1$
$r_7 = 1.2007$
  $d_7 = 0.4016$   $n_5 = 1.6485$   $\nu_5 = 45.8$
$r_8 = -1.4631$
  $d_8 = 0.0766$
$r_9 = 1.1928$
  $d_9 = 0.0652$   $n_6 = 1.72342$   $\nu_6 = 38.0$
$r_{10} = 0.6313$
  $d_{10} = 0.0288 \sim 0.0912$

---

-continued

Embodiment 1

$r_{11} = 0.6403$
  $d_{11} = 0.0978$   $n_7 = 1.804$   $\nu_7 = 46.6$
$r_{12} = 3.7617$
  $d_{12} = 0.0570$
$r_{13} = 0.8881$
  $d_{13} = 0.0468$   $n_8 = 1.744$   $\nu_8 = 44.7$
$r_{14} = 0.5475$
  $d_{14} = 0.4244$   $n_9 = 1.67003$   $\nu_9 = 47.3$
$r_{15} = 0.8106$
  $d_{15} = 0.0815$
$r_{16} = 3.7634$
  $d_{16} = 0.0615$   $n_{10} = 1.78472$   $\nu_{10} = 25.7$
$r_{17} = 0.8420$
  $d_{17} = 0.0619$
$r_{18} = 3.9741$
  $d_{18} = 0.0823$   $n_{11} = 1.58921$   $\nu_{11} = 41.1$
$r_{19} = 1.5948$
  $f_1 = -1.7813$
  $f_2 = 11.8158$
  $f_3 = 1.3883$

---

Embodiment 2

$f = 1.0 \sim 1.587$
$r_1 = 5.6713$
  $d_1 = 0.0814$   $n_1 = 1.72$   $\nu_1 = 42.1$
$r_2 = 1.1523$
  $d_2 = 0.3255$
$r_3 = -24.6163$
  $d_3 = 0.1546$   $n_2 = 1.80518$   $\nu_2 = 25.4$
$r_4 = -2.0972$
  $d'_3 = 0.0081$
$r'_4 = -2.2618$
  $d_4 = 0.0610$   $n_3 = 1.50137$   $\nu_3 = 56.4$
$r_5 = 2.7085$
  $d_5 = 1.3174 \sim 0.3328$
$r_6 = 3.2343$
  $d_6 = 0.0814$   $n_4 = 1.72$   $\nu_4 = 42.1$
$r_7 = 0.7385$
  $d_7 = 0.3836$   $n_5 = 1.6485$   $\nu_5 = 45.8$
$r_8 = -1.4136$
  $d_8 = 0.0765$
$r_9 = 1.3889$
  $d_9 = 0.0651$   $n_6 = 1.72342$   $\nu_6 = 38.0$
$r_{10} = 0.6610$
  $d_{10} = 0.0237 \sim 0.0786$
$r_{11} = 0.6548$
  $d_{11} = 0.1111$   $n_7 = 1.804$   $\nu_7 = 46.6$
$r_{12} = 7.0504$
  $d_{12} = 0.0598$
$r_{13} = -0.9411$
  $d_{13} = 0.0468$   $n_8 = 1.744$   $\nu_8 = 44.7$
$r_{14} = 0.8609$
  $d_{14} = 0.3999$   $n_9 = 1.66998$   $\nu_9 = 39.3$
$r_{15} = -0.9236$
  $d_{15} = 0.0500$
$r_{16} = 6.3609$
  $d_{16} = 0.0614$   $n_{10} = 1.78472$   $\nu_{10} = 25.7$
$r_{17} = 0.8373$
  $d_{17} = 0.0618$
$r_{18} = -48.3564$
  $d_{18} = 0.0822$   $n_{11} = 1.58913$   $\nu_{11} = 61.1$
$r_{19} = -1.0554$
  $f_1 = -1.7791$
  $f_2 = 11.8013$
  $f_3 = 1.3873$

---

Embodiment 3

$f = 1.0 \sim 1.458$
$r_1 = 2.4225$
  $d_1 = 0.0816$   $n_1 = 1.713$   $\nu_1 = 53.9$
$r_2 = 1.1551$
  $d_2 = 0.4082$
$r_3 = -33.2515$
  $d_3 = 0.2041$   $n_2 = 1.80518$   $\nu_2 = 25.4$ -continued Embodiment 3

| | | |
|---|---|---|
| $r_4 = -2.6202$ | | |
| $d_4 = 0.0612$ | $n_3 = 1.50137$ | $\nu_3 = 56.4$ |
| $r_5 = 1.4239$ | | |
| $d_5 = 1.1889 \sim 0.4151$ | | |
| $r_6 = 2.6396$ | | |
| $d_6 = 0.4412$ | $n_4 = 1.68893$ | $\nu_4 = 31.1$ |
| $r_7 = 0.9257$ | | |
| $d_7 = 0.3633$ | $n_5 = 1.6516$ | $\nu_5 = 58.7$ |
| $r_8 = -1.8282$ | | |
| $d_8 = 0.0041$ | | |
| $r_9 = 1.4003$ | | |
| $d_9 = 0.0657$ | $n_6 = 1.72342$ | $\nu_6 = 38.0$ |
| $r_{10} = 0.6641$ | | |
| $d_{10} = 0.0378 \sim 0.0901$ | | |
| $r_{11} = 0.6873$ | | |
| $d_{11} = 0.1102$ | $n_7 = 1.7859$ | $\nu_7 = 44.1$ |
| $r_{12} = 6.3436$ | | |
| $d_{12} = 0.1224$ | | |
| $r_{13} = -0.8140$ | | |
| $d_{13} = 0.0506$ | $n_8 = 1.72$ | $\nu_8 = 43.7$ |
| $r_{14} = 0.7542$ | | |
| $d_{14} = 0.2600$ | $n_9 = 1.66998$ | $\nu_9 = 39.3$ |
| $r_{15} = -0.8544$ | | |
| $d_{15} = 0.0531$ | | |
| $r_{16} = 2.1073$ | | |
| $d_{16} = 0.0612$ | $n_{10} = 1.78472$ | $\nu_{10} = 25.7$ |
| $r_{17} = 0.8296$ | | |
| $d_{17} = 0.0694$ | | |
| $r_{18} = -6.8119$ | | |
| $d_{18} = 0.0816$ | $n_{11} = 1.58913$ | $\nu_{11} = 61.1$ |
| $r_{19} = 1.0722$ | | |
| $f_1 = -1.6220$ | | |
| $f_2 = 13.3478$ | | |
| $f_3 = 1.3030$ | | |

Embodiment 4

| | | |
|---|---|---|
| $f = 1.0 \sim 1.456$ | | |
| $r_1 = 2.7119$ | | |
| $d_1 = 0.0817$ | $n_1 = 1.713$ | $\nu_1 = 53.9$ |
| $r_2 = 1.2463$ | | |
| $d_2 = 0.3876$ | | |
| $r_3 = -37.0068$ | | |
| $d_3 = 0.2185$ | $n_2 = 1.80518$ | $\nu_2 = 25.4$ |
| $r_4 = -2.6686$ | | |
| $d_4 = 0.0613$ | $n_3 = 1.50137$ | $\nu_3 = 56.4$ |
| $r_5 = 1.3744$ | | |
| $d_5 = 1.1828 \sim 0.4084$ | | |
| $r_6 = 3.0705$ | | |
| $d_6 = 0.4624$ | $n_4 = 1.68893$ | $\nu_4 = 31.1$ |
| $r_7 = 0.9025$ | | |
| $d_7 = 0.3640$ | $n_5 = 1.6516$ | $\nu_5 = 58.7$ |
| $r_8 = -1.6293$ | | |
| $d_8 = 0.0041$ | | |
| $r_9 = 1.3059$ | | |
| $d_9 = 0.0874$ | $n_6 = 1.72342$ | $\nu_6 = 38.0$ |
| $r_{10} = 0.6312$ | | |
| $d_{10} = 0.322 \sim 0.0846$ | | |
| $r_{11} = 0.6471$ | | |
| $d_{11} = 0.1144$ | $n_7 = 1.7859$ | $\nu_7 = 44.1$ |
| $r_{12} = 3.6198$ | | |
| $d_{12} = 0.0609$ | | |
| $r_{13} = -1.0349$ | | |
| $d_{13} = 0.0408$ | $n_8 = 1.697$ | $\nu_8 = 48.5$ |
| $r_{14} = 1.8342$ | | |
| $d_{14} = 0.2749$ | $n_9 = 1.64769$ | $\nu_9 = 33.8$ |
| $r_{15} = -1.2644$ | | |
| $d_{15} = 0.1156$ | | |
| $r_{16} = 4.3007$ | | |
| $d_{16} = 0.0613$ | $n_{10} = 1.78472$ | $\nu_{10} = 25.7$ |
| $r_{17} = 0.9236$ | | |
| $d_{17} = 0.0613$ | | |
| $r_{18} = -10.0803$ | | |
| $d_{18} = 0.1021$ | $n_{11} = 1.618$ | $\nu_{11} = 63.38$ |
| $r_{19} = -0.8906$ | | |
| $f_1 = -1.6232$ | | |
| $f_2 = 13.3582$ | | |

-continued

Embodiment 4

| |
|---|
| $f_3 = 1.3062$ | wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $f_1$ through $f_3$ designate focal lengths of the first, second and third lens groups respectively and the reference symbol f denotes focal length of the lens system as a whole which is expressed taking the focal length at the wide position as 1.

Figure 2:
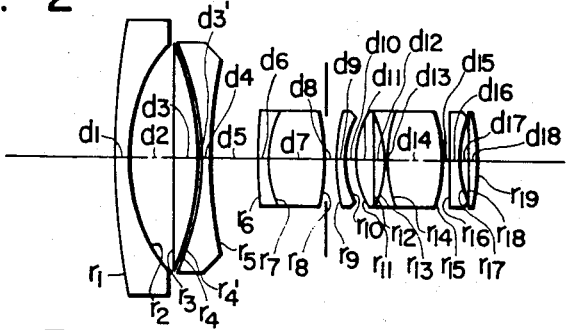
Figure 3:
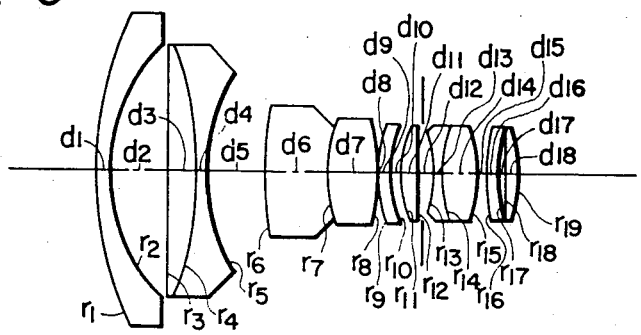
Figure 4:
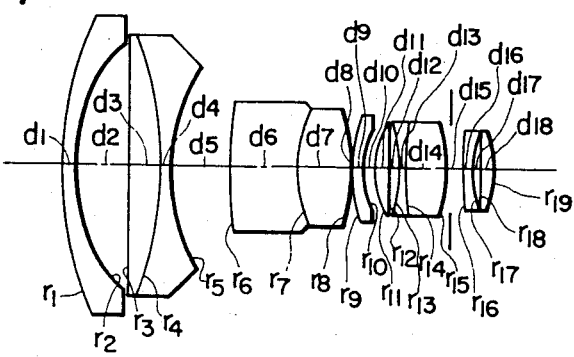
Figure 5:
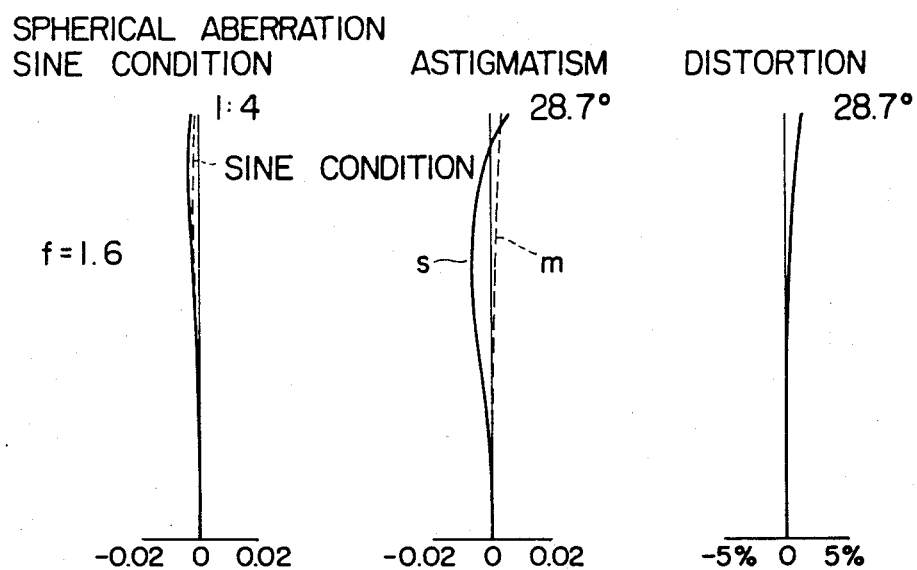
FIG. 5 through FIG. 7 show curves illustrating the aberration characteristics of the Embodiment 1.
Figure 6:
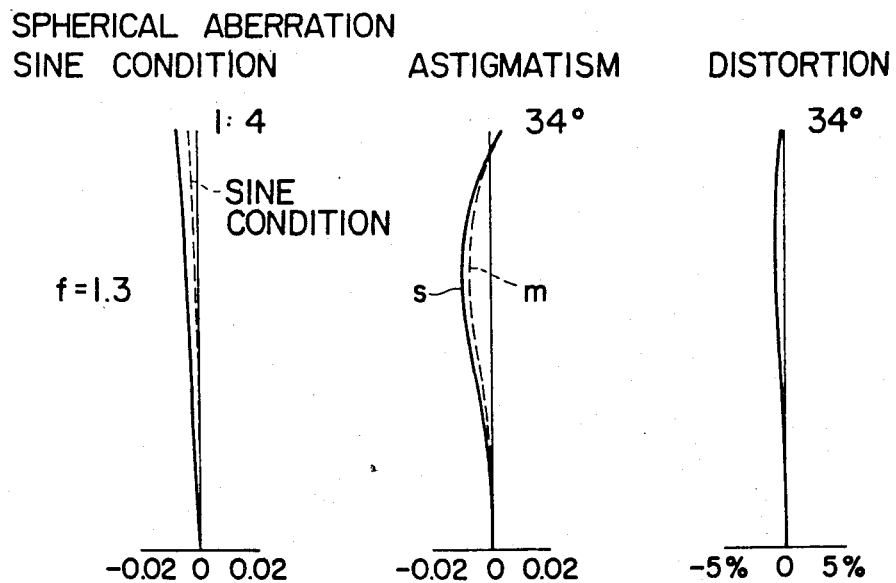
Figure 7:
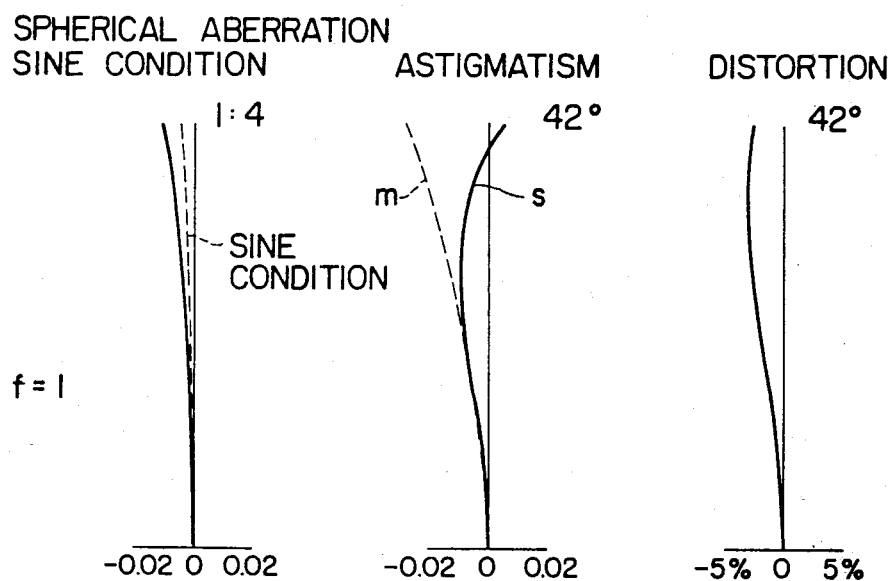
Figure 8:
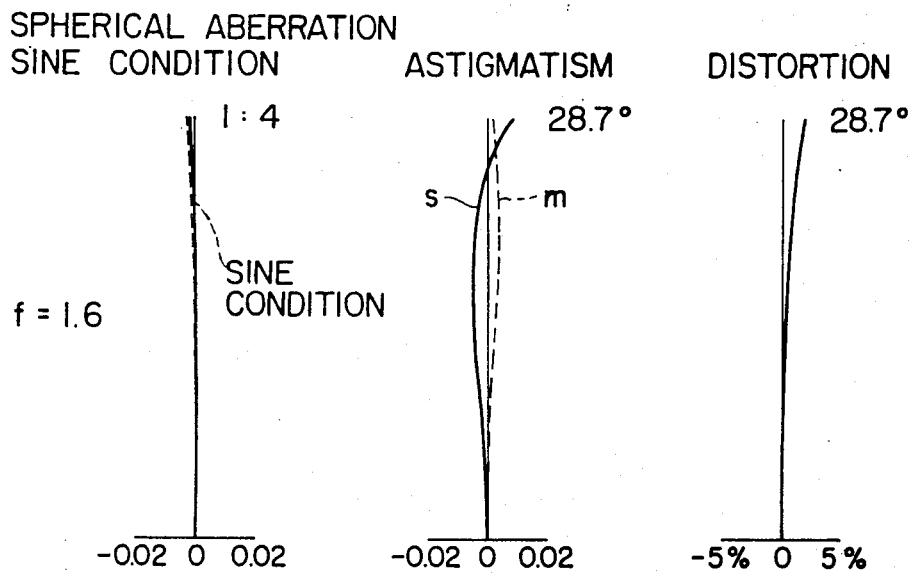
FIG. 8 through FIG. 10 show graphs illustrating the aberration characteristics of the Embodiment 2.
Figure 9:
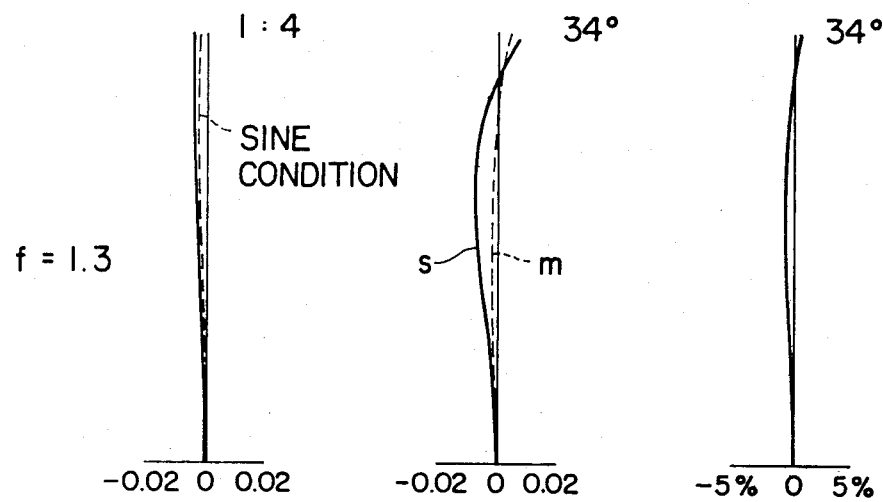
Figure 10:
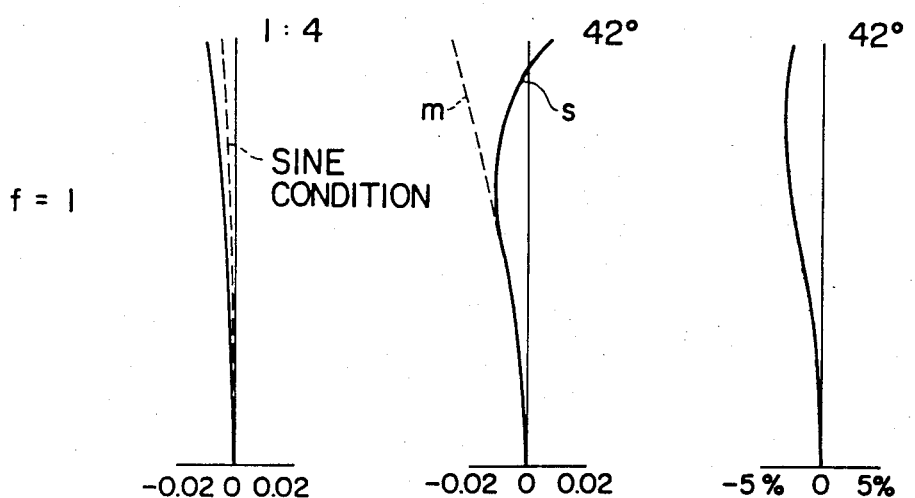
Figure 11:
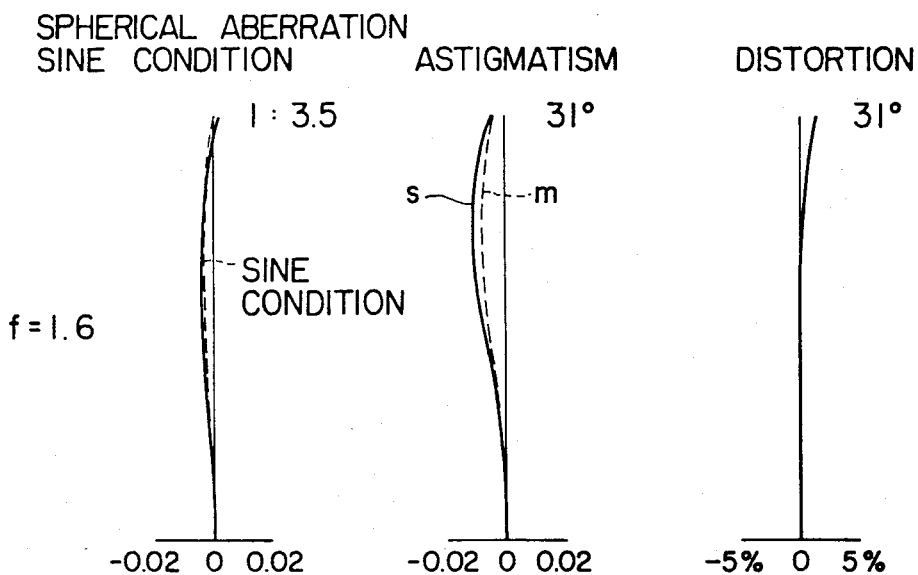
FIG. 11 through FIG. 13 illustrate graphs showing the aberration characteristics of the Embodiment 3.
Figure 12:
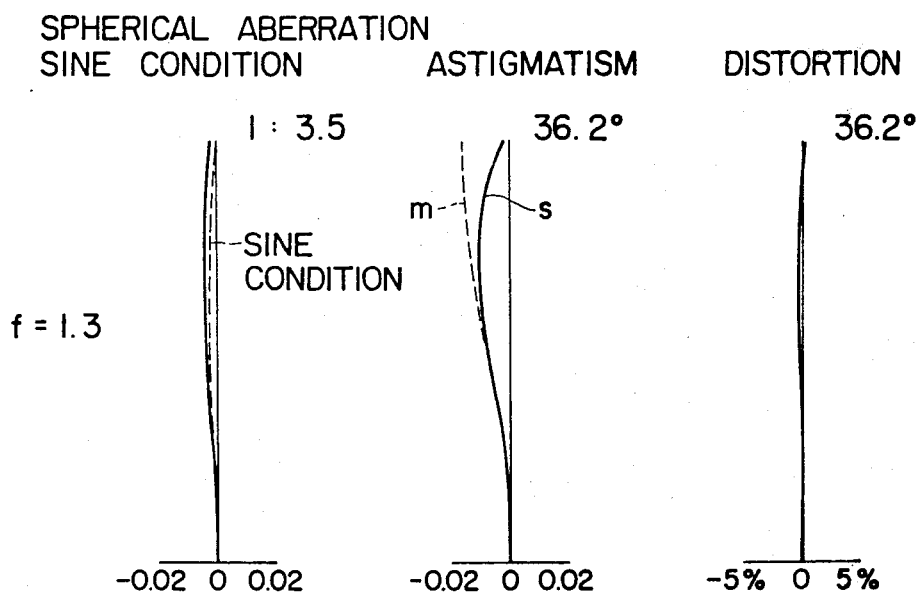
Figure 13:
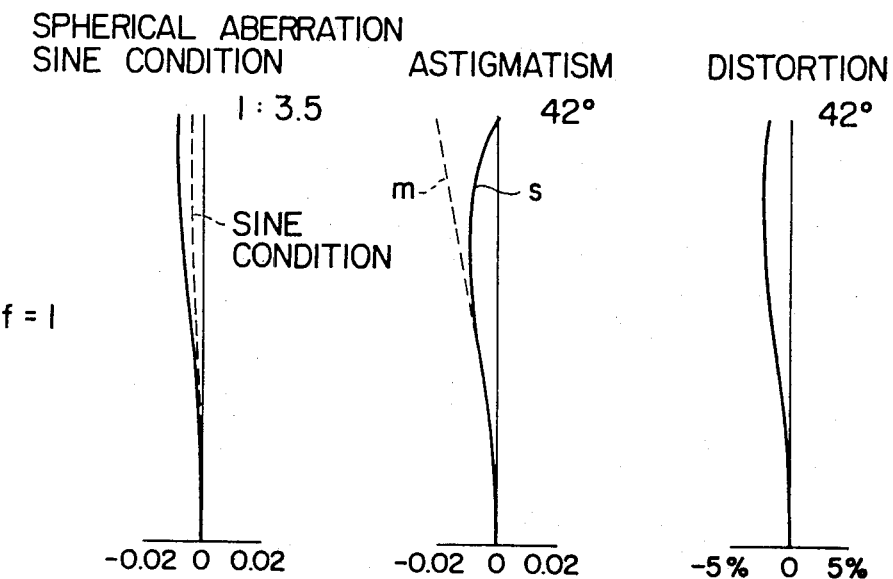
Figure 14:
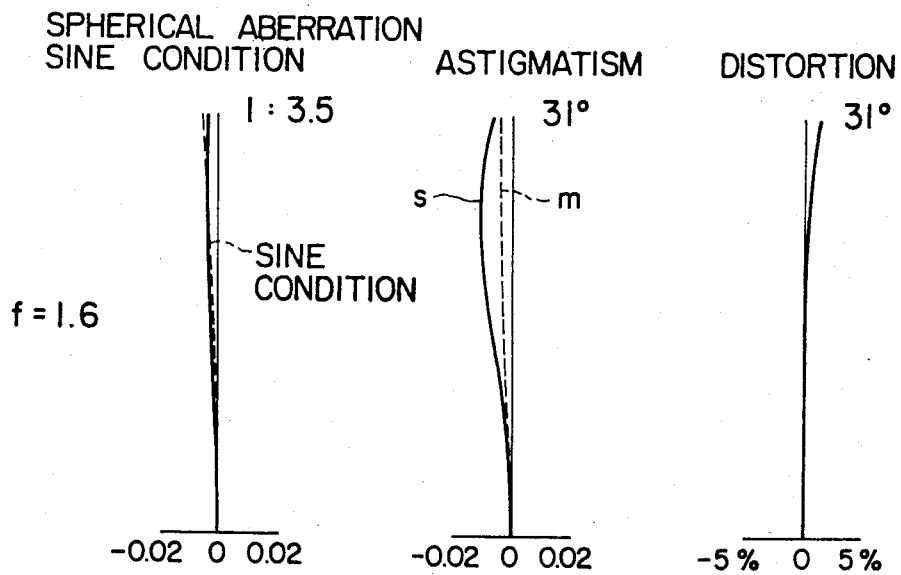
FIG. 14 through FIG. 16 show graphs illustrating aberration characteristics of the Embodiment 4.
Figure 15:
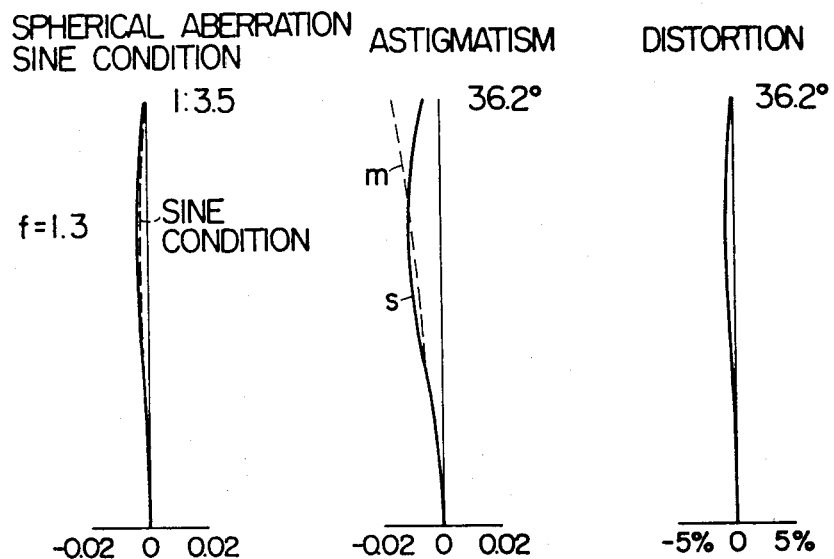
Figure 16:
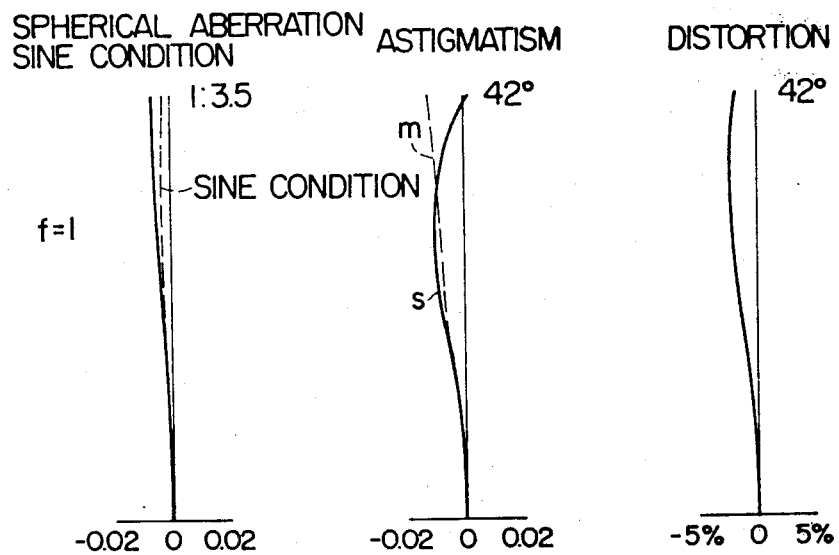

Of the embodiments described above, Embodiment 1 is a lens system which has the composition shown in FIG. 1 and comprises a first lens group consisting of a negative meniscus lens element and a cemented lens component, the aberration characteristics of said lens system being illustrated in FIG. 5 (in case of f=1.6), FIG. 6 (in case of f=1.3) and FIG. 7 (in case of f=1). The Embodiment 2 has the composition shown in FIG. 2 and comprises a first lens group consisting of a negative meniscus lens element and a positive and negative lens element which are separated, radii of curvature on the object side surface of said negative element being represented by $r'_4$ and the airspace between the separated lens elements is designated by $d'_3$ in the embodiment. The aberration characteristics of the Embodiment 2 are illustrated in FIG. 8 (f=1.6), FIG. 9 (f=1.3) and FIG. 10 (f=1). Further, the Embodiments 3 and 4 have the compositions shown in FIG. 3 and FIG. 4 respectively and commonly comprise a first lens group in which the image side lens component is a cemented doublet. The aberration characteristics of these embodiments are illustrated in FIG. 11 through FIG. 13 (f=1.6, f=1.3 and f=1.0) and FIG. 14 through FIG. 16 (f=1.6, f=1.3 and f=1.0) respectively.

As is understood from the foregoing descriptions and embodiments illustrated above, the present invention provides a very compact wide-angle zoom lens system wherein aberrations are favorably corrected in spite of a wide field angle of 84° at its wide position, and the Embodiments 1 and 2 are epoch-making compact wide-angle zoom lens systems which are usable with filters having a small diameter about 55 mm.

I claim:

1. A compact wide-angle zoom lens system comprising a first lens group comprising a negative meniscus lens element having a concave surface of the object side and a lens component having negative refractive power, a second lens group comprising a positive cemented doublet lens component and a negative meniscus lens element having a convex surface on the object side and a third lens group comprising at least a positive meniscus lens element having a convex surface on the object side and a cemented doublet lens component, and said lens system being so designed as to change its focal length by displacing said first, second and third lens groups respectively and, in addition, to meet the following conditions:

$$1.5f < |f_1| < 2f, f_1 < 0 \qquad (1)$$

$$12f < f_2 < 15f \quad (2)$$

$$0.55f < D_2 < f \quad (3)$$

wherein the reference symbols f represents the focal length of the entire lens system as a whole at its wide position, the reference symbols $f_1$ and $f_2$ designate the focal lengths of the first and second lens group respectively and the reference symbol $D_2$ denotes the total length of the second lens group.

2. A compact wide-angle zoom lens system according to claim 1 additionally satisfying the following conditions:

$$0.25f < d_{13} + d_{14} < 0.55f \quad (4)$$

$$|f'| > 5f \quad (5)$$

wherein the reference symbol $d_{13} + d_{14}$ represents the thickness of the cemented components of the third lens group and the reference symbol f' designates the focal length of the cemented component of the third lens group.

3. A compact wide-angle zoom lens system according to claim 1 wherein the first lens group consists of a negative meniscus lens element and a negative cemented doublet lens component.

4. A compact wide-angle zoom lens system according to claim 3 wherein the third lens group consists of a positive meniscus lens element having a convex surface on the object side, a cemented doublet lens component, a negative lens element and a positive lens element, and said lens system having the following numerical data:

| f = 1.0 ~ 1.589 | | |
|---|---|---|
| $r_1 = 5.2540$ | | |
| $d_1 = 0.0815$ | $n_1 = 1.72342$ | $\nu_1 = 38.0$ |
| $r_2 = 1.1981$ | | |
| $d_2 = 0.3014$ | | |
| $r_3 = -64.0574$ | | |
| $d_3 = 0.1935$ | $n_2 = 1.80518$ | $\nu_2 = 25.4$ |
| $r_4 = -1.7706$ | | |
| $d_4 = 0.0611$ | $n_3 = 1.51118$ | $\nu_3 = 51.0$ |
| $r_5 = 2.1700$ | | |
| $d_5 = 1.2580 \sim 0.2649$ | | |
| $r_6 = 4.3124$ | | |
| $d_6 = 0.0815$ | $n_4 = 1.72$ | $\nu_4 = 42.1$ |
| $r_7 = 1.2007$ | | |
| $d_7 = 0.4016$ | $n_5 = 1.6485$ | $\nu_5 = 45.8$ |
| $r_8 = -1.4631$ | | |
| $d_8 = 0.0766$ | | |
| $r_9 = 1.1928$ | | |
| $d_9 = 0.0652$ | $n_6 = 1.72342$ | $\nu_6 = 38.0$ |
| $r_{10} = 0.6313$ | | |
| $d_{10} = 0.0288 \sim 0.0912$ | | |
| $r_{11} = 0.6403$ | | |
| $d_{11} = 0.0978$ | $n_7 = 1.804$ | $\nu_7 = 46.6$ |
| $r_{12} = 3.7617$ | | |
| $d_{12} = 0.0570$ | | |
| $r_{13} = -0.8881$ | | |
| $d_{13} = 0.0468$ | $n_8 = 1.744$ | $\nu_8 = 44.7$ |
| $r_{14} = 0.5475$ | | |
| $d_{14} = 0.4244$ | $n_9 = 1.67003$ | $\nu_9 = 47.3$ |
| $r_{15} = -0.8106$ | | |
| $d_{15} = 0.0815$ | | |
| $r_{16} = 3.7634$ | | |
| $d_{16} = 0.0615$ | $n_{10} = 1.78472$ | $\nu_{10} = 25.7$ |
| $r_{17} = 0.8420$ | | |
| $d_{17} = 0.0619$ | | |
| $r_{18} = 3.9741$ | | |
| $d_{18} = 0.0823$ | $n_{11} = 1.58921$ | $\nu_{11} = 41.1$ |
| $r_{19} = -1.5948$ | | |
| $f_1 = -1.7813$ | | |
| $f_2 = 11.8158$ | | |

-continued

| $f_3 = 1.3883$ |
|---| wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $f_1$ through $f_3$ designate focal lengths of the first, second and third lens groups respectively and the reference symbol f denotes focal length of the lens system as a whole which is expressed taking the focal length at the wide position as 1.

5. A compact wide-angle zoom lens system according to claim 1 wherein the first lens group consists of a negative meniscus lens element having a convex surface on the object side, a positive lens element and a negative lens element.

6. A compact wide-angle zoom lens system according to claim 5 wherein the third lens group consists of a positive meniscus lens element having a convex surface on the object side, a cemented doublet lens component, a negative lens element and a positive lens element, and said lens system having the following numerical data:

| f = 1.0 ~ 1.587 | | |
|---|---|---|
| $r_1 = 5.6713$ | | |
| $d_1 = 0.0814$ | $n_1 = 1.72$ | $\nu_1 = 42.1$ |
| $r_2 = 1.1523$ | | |
| $d_2 = 0.3255$ | | |
| $r_3 = -24.6163$ | | |
| $d_3 = 0.1546$ | $n_2 = 1.80518$ | $\nu_2 = 25.4$ |
| $r_4 = -2.0972$ | | |
| $d'_3 = 0.0081$ | | |
| $r'_4 = -2.2618$ | | |
| $d_4 = 0.0610$ | $n_3 = 1.50137$ | $\nu_3 = 56.4$ |
| $r_5 = 2.7085$ | | |
| $d_5 = 1.3174 \sim 0.3328$ | | |
| $r_6 = 3.2343$ | | |
| $d_6 = 0.0814$ | $n_4 = 1.72$ | $\nu_4 = 42.1$ |
| $r_7 = 0.7385$ | | |
| $d_7 = 0.3836$ | $n_5 = 1.6485$ | $\nu_5 = 45.8$ |
| $r_8 = -1.4136$ | | |
| $d_8 = 0.0765$ | | |
| $r_9 = 1.3889$ | | |
| $d_9 = 0.0651$ | $n_6 = 1.72342$ | $\nu_6 = 38.0$ |
| $r_{10} = 0.6610$ | | |
| $d_{10} = 0.237 \sim 0.0786$ | | |
| $r_{11} = 0.6548$ | | |
| $d_{11} = 0.1111$ | $n_7 = 1.804$ | $\nu_7 = 46.6$ |
| $r_{12} = 7.0504$ | | |
| $d_{12} = 0.0598$ | | |
| $r_{13} = -0.9411$ | | |
| $d_{13} = 0.0468$ | $n_8 = 1.744$ | $\nu_8 = 44.7$ |
| $r_{14} = 0.8609$ | | |
| $d_{14} = 0.3999$ | $n_9 = 1.66998$ | $\nu_9 = 39.3$ |
| $r_{15} = -0.9236$ | | |
| $d_{15} = 0.0500$ | | |
| $r_{16} = 6.3609$ | | |
| $d_{16} = 0.0614$ | $n_{10} = 1.78472$ | $\nu_{10} = 25.7$ |
| $r_{17} = 0.8373$ | | |
| $d_{17} = 0.0618$ | | |
| $r_{18} = -48.3564$ | | |
| $d_{18} = 0.0822$ | $n_{11} = 1.58913$ | $\nu_{11} = 61.1$ |
| $r_{19} = -1.0554$ | | |
| $f_1 = -1.7791$ | | |
| $f_2 = 11.8013$ | | |
| $f_3 = 1.3873$ | | | wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $f_1$ through $f_3$ designate focal lengths of the first, second and third lens groups respectively and the reference symbol f denotes focal length of the lens system as a whole which is expressed taking the focal length at the wide position as 1.

7. A compact wide-angle zoom lens system according to claim 3 wherein the third lens group consists of a positive meniscus lens element having a convex surface on the object side, a cemented doublet lens component, a negative lens element and a positive lens element, and said lens system having the following numerical data:

| $f = 1.0 \sim 1.458$ | | | |
|---|---|---|---|
| $r_1 = 2.4225$ | | | |
| $d_1 = 0.0816$ | $n_1 = 1.713$ | $\nu_1 = 53.9$ | |
| $r_2 = 1.1551$ | | | |
| $d_2 = 0.4082$ | | | |
| $r_3 = -33.2515$ | | | |
| $d_3 = 0.2041$ | $n_2 = 1.80518$ | $\nu_2 = 25.4$ | |
| $r_4 = -2.6202$ | | | |
| $d_4 = 0.0612$ | $n_3 = 1.50137$ | $\nu_3 = 56.4$ | |
| $r_5 = 1.4239$ | | | |
| $d_5 = 1.1889 \sim 0.4151$ | | | |
| $r_6 = 2.6396$ | | | |
| $d_6 = 0.4412$ | $n_4 = 1.68893$ | $\nu_4 = 31.1$ | |
| $r_7 = 0.9257$ | | | |
| $d_7 = 0.3633$ | $n_5 = 1.6516$ | $\nu_5 = 58.7$ | |
| $r_8 = -1.8282$ | | | |
| $d_8 = 0.0041$ | | | |
| $r_9 = 1.4003$ | | | |
| $d_9 = 0.0657$ | $n_6 = 1.72342$ | $\nu_6 = 38.0$ | |
| $r_{10} = 0.6641$ | | | |
| $d_{10} = 0.0378 \sim 0.0901$ | | | |
| $r_{11} = 0.6873$ | | | |
| $d_{11} = 0.1102$ | $n_7 = 1.7859$ | $\nu_7 = 44.1$ | |
| $r_{12} = 6.3436$ | | | |
| $d_{12} = 0.1224$ | | | |
| $r_{13} = -0.8140$ | | | |
| $d_{13} = 0.0506$ | $n_8 = 1.72$ | $\nu_8 = 43.7$ | |
| $r_{14} = 0.7542$ | | | |
| $d_{14} = 0.2600$ | $n_9 = 1.66998$ | $\nu_9 = 39.3$ | |
| $r_{15} = -0.8544$ | | | |
| $d_{15} = 0.0531$ | | | |
| $r_{16} = 2.1073$ | | | |
| $d_{16} = 0.0612$ | $n_{10} = 1.78472$ | $\nu_{10} = 25.7$ | |
| $r_{17} = 0.8296$ | | | |
| $d_{17} = 0.0694$ | | | |
| $r_{18} = -6.8119$ | | | |
| $d_{18} = 0.0816$ | $n_{11} = 1.58913$ | $\nu_{11} = 61.1$ | |
| $r_{19} = -1.0722$ | | | |
| $f_1 = -1.6220$ | | | |
| $f_2 = 13.3478$ | | | |
| $f_3 = 1.3030$ | | | | wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $f_1$ through $f_3$ designate focal lengths of the first, second and third lens groups respectively and the reference symbol f denotes focal length of the lens system as a whole which is expressed taking the focal length at the wide position as 1.

8. A compact wide-angle zoom lens system according to claim 3 wherein the third lens group consists of a positive meniscus lens element having a convex surface on the object side, a cemented doublet lens component, a negative lens element and a positive lens element, and said lens system having the following numerical data:

| $f = 1.0 \sim 1.456$ | | | |
|---|---|---|---|
| $r_1 = 2.7119$ | | | |
| $d_1 = 0.0817$ | $n_1 = 1.713$ | $\nu_1 = 53.9$ | |
| $r_2 = 1.2463$ | | | |
| $d_2 = 0.3876$ | | | |
| $r_3 = -37.0068$ | | | |
| $d_3 = 0.2185$ | $n_2 = 1.80518$ | $\nu_2 = 25.4$ | |
| $r_4 = -2.6686$ | | | |
| $d_4 = 0.0613$ | $n_3 = 1.50137$ | $\nu_3 = 56.4$ | |
| $r_5 = 1.3744$ | | | |
| $d_5 = 1.1828 \sim 0.4084$ | | | |
| $r_6 = 3.0705$ | | | |
| $d_6 = 0.4624$ | $n_4 = 1.68893$ | $\nu_4 = 31.1$ | |
| $r_7 = 0.9025$ | | | |
| $d_7 = 0.3640$ | $n_5 = 1.6516$ | $\nu_5 = 58.7$ | |
| $r_8 = -1.6293$ | | | |
| $d_8 = 0.0041$ | | | |
| $r_9 = 1.3059$ | | | |
| $d_9 = 0.0874$ | $n_6 = 1.72342$ | $\nu_6 = 38.0$ | |
| $r_{10} = 0.6312$ | | | |
| $d_{10} = 0.0322 \sim 0.0846$ | | | |
| $r_{11} = 0.6471$ | | | |
| $d_{11} = 0.1144$ | $n_7 = 1.7859$ | $\nu_7 = 44.1$ | |
| $r_{12} = 3.6198$ | | | |
| $d_{12} = 0.0609$ | | | |
| $r_{13} = -1.0349$ | | | |
| $d_{13} = 0.0408$ | $n_8 = 1.697$ | $\nu_8 = 48.5$ | |
| $r_{14} = 1.8342$ | | | |
| $d_{14} = 0.2749$ | $n_9 = 1.64769$ | $\nu_9 = 33.8$ | |
| $r_{15} = -1.2644$ | | | |
| $d_{15} = 0.1156$ | | | |
| $r_{16} = 4.3007$ | | | |
| $d_{16} = 0.0613$ | $n_{10} = 1.78472$ | $\nu_{10} = 25.7$ | |
| $r_{17} = 0.9236$ | | | |
| $d_{17} = 0.0613$ | | | |
| $r_{18} = -10.0803$ | | | |
| $d_{18} = 0.1021$ | $n_{11} = 1.618$ | $\nu_{11} = 63.38$ | |
| $r_{19} = -0.8906$ | | | |
| $f_1 = -1.6232$ | | | |
| $f_2 = 13.3582$ | | | |
| $f_3 = 1.3062$ | | | | wherein the reference symbols $r_1$ through $r_{19}$ represent radii of curvature on the surfaces of the respective lens elements, the reference symbols $d_1$ through $d_{18}$ designate thicknesses of the respective lens elements and airspaces therebetween, the reference symbols $n_1$ through $n_{11}$ denote refractive indices of the respective lens elements, the reference symbols $\nu_1$ through $\nu_{11}$ represent Abbe's numbers of the respective lens elements, the reference symbols $f_1$ through $f_3$ designate focal lengths of the first, second and third lens groups respectively and the reference symbol f denotes focal length of the lens system as a whole which is expressed taking the focal length at the wide position as 1.

* * * * *